UNITED STATES PATENT OFFICE.

HEINRICH SPECKETER AND GUSTAV MÜNCH, OF GRIESHEIM, GERMANY, ASSIGNORS TO CHEMISCHE FABRIK GRIESHEIM-ELEKTRON, OF FRANKFORT-ON-THE-MAIN, GERMANY, A CORPORATION OF GERMANY.

PRODUCTION OF ANHYDROUS HYDROSULFITES FROM AQUEOUS HYDROSULFITE SOLUTIONS.

1,156,107.

Specification of Letters Patent.

Patented Oct. 12, 1915.

No Drawing. Application filed July 3, 1913. Serial No. 777,306.

*To all whom it may concern:*

Be it known that we, HEINRICH SPECKETER and GUSTAV MÜNCH, both subjects of the German Emperor, and residents of Griesheim-on-the-Main, Germany, have invented certain new and useful Improvements in the Production of Anhydrous Hydrosulfites from Aqueous Hydrosulfite Solutions, of which the following is a specification.

According to the literature relating to hydrosulfites, it has not so far been possible to obtain high percentage, anhydrous and stable hydrosulfites by simply evaporating, to dryness, hydrosulfite solutions *in vacuo*. For this reason it has hitherto been usual to so conduct the manufacture of anhydrous hydrosulfites that the hydrosulfites were first separated from their solution and afterward subjected to a special dehydrating process.

The specification of German Patent 191,594 shows what small prospects there appeared to be of the production of anhydrous hydrosulfites by direct evaporation to dryness of aqueous solutions. The process described in the said specification (which has for its object to produce sodium hydrosulfite containing crystallization water by evaporating to dryness its solution *in vacuo*) requires that the evaporation should not be carried to the point of completely drying the product, as then local overheating cannot be avoided. For this reason the aforesaid German specification states expressly that a crystallization lye should remain and that evaporation should only be carried out to one third of the volume used. By that process it was only possible to obtain by direct evaporation to dryness of the solution, hydrosulfites containing water of crystallization which, as is known, were not stable.

According to the specification of German Patent No. 200,291 it might indeed be possible to obtain, from a pulp of hydrated hydrosulfite and even from hydrosulfite solutions, anhydrous hydrosulfite of high percentage content, if these solutions be allowed to evaporate rapidly by causing them to fall in drops on highly heated surfaces.

In contrast therewith the present invention has for its object to produce in a very simple manner anhydrous high percentage, stable hydrosulfites and is based on the following observations. Investigations and experiments which we have made led to the result contrary to the views hitherto held and to previous practice that when working on a large scale we have obtained by simple evaporation to dryness *in vacuo* hydrosulfite solutions, excellent yields of high percentage and stable hydrosulfites, provided care be taken to avoid the formation of lumps which is done by constantly and suitably, mixing or stirring, the contents of the vessel.

The evaporation can be effected in simple iron vacuum evaporating apparatus while constantly stirring by means of suitable agitators, for instance rake stirrers which prevent the formation of lumps.

The temperature is, during the evaporation of the water, kept at from 30° to 35° centigrade and is then gradually raised to a temperature of 100° centigrade.

The carrying out the process according to this invention on a large scale gives better results than are obtained when small quantities are dealt with.

The following examples illustrate how the invention can be carried out, but it is not limited to these examples.

Example 1: 100 liters of freshly prepared sodium hydrosulfite solution are evaporated to dryness while avoiding the formation of lumps as aforesaid. A uniform fine powder is obtained giving a good yield (from 90 to 95 per cent.) of $Na_2S_2O_4$. The resulting product could not in any way be predicted, as hitherto, as stated in the preamble of the specification, it was contended that protracted heating of hydrosulfite in the presence of water would necessarily lead to decomposition (see for instance the aforesaid specification 200,291).

In carrying out this invention we may, if desired, add anilin or similar base, of high boiling point, in such quantity that after evaporating the water the free base is still present but it is removed by continued distillation. In working with the addition of anilin, or the like, an emulsion-like mixture is formed at the commencement of the operation which contains the anilin or the like in a most finely divided state. The salt which separates during the evaporation remains completely loose and dries without caking together. The temperature first maintained at 30° centigrade and is finally raised to about 100° centigrade. While at the lower initial temperature a mixture of water and analin or the like distils over, only pure anilin or the like passing over at the end. Owing to the thorough penetration of the mass by the base, caking is avoided and the obtainment of a pulverulent material is secured. In addition to this the base possesses also, owing to its basic properties, the important advantage of binding in the form of anilin sulfite, for example, any sulfurous acid that might be liberated during evaporation, the said anilin sulfite distilling over in the receiver and being thus prevented from reacting upon the hydrosulfite. The base can be readily recuperated from the distillate as, owing to its small vapor tension, it scarcely volatilizes out of the cooled receiver. After being separated from the water of the distillate, it can be directly used again.

Example 2: 100 liters of a solution of sodium hydrosulfite are mixed with 50 liters of anilin and evaporated to dryness in a good vacuum while being constantly stirred. A high percentage of perfectly dry and loose sodium hydrosulfites is thereby obtained.

It has already been proposed to evaporate to dryness hydrosulfite solutions with the addition of small amounts of caustic soda, borax, disodium phosphate, ammonia, anilin, pyridin, quinolin and the like so as to obtain in this manner mixtures of dissolved, or solid, hydrosulfite and of the said additions, which latter however in this case simply render the decomposable hydrosulfite stable, and according to that process only small quantities of the base are used which are found in the final product. Anilin or the like used in accordance with the present invention must be present during the whole of the evaporating process but it is distilled off from the final product, so that no mixture, but simply an anhydrous, stable hydrosulfite is obtained.

The process in accordance with this invention has, over the processes hitherto known for the production of stable hydrosulfite, the great technical advantage that for the first time it effects in one operation the separation of solid hydrosulfite from solutions and subsequent drying and that contrarily to all previous suppositions and expectations, an excellent yield of high percentage, anhydrous and stable product is obtained.

We claim:

1. The hereindescribed method of producing a high per cent. anhydrous hydrosulfite comprising mixing with an aqueous hydrosulfite solution an organic base and evaporating said solution to dryness, the amount of said base being in excess of that which is removed by the evaporation of the water of the solution.

2. The hereindescribed method of producing a high per cent. anhydrous hydrosulfite comprising mixing anilin with an aqueous hydrosulfite solution and evaporating said solution to dryness, the amount of anilin employed being such that it is present as a free base after the water of the solution is evaporated and is removed by the subsequent distillation.

3. The hereindescribed method of producing a high per cent. anhydrous hydrosulfite comprising mixing with an aqueous hydrosulfite solution an organic base and evaporating said solution to dryness while constantly agitating, the amount of said base being in excess of that which is removed by the evaporation of the water of the solution.

In testimony whereof we have signed our names to this specification in the presence of two subscribing witnesses.

HEINRICH SPECKETER.
GUSTAV MÜNCH.

Witnesses:
JEAN GRUND,
CARL GRUND.